Patented Feb. 20, 1951

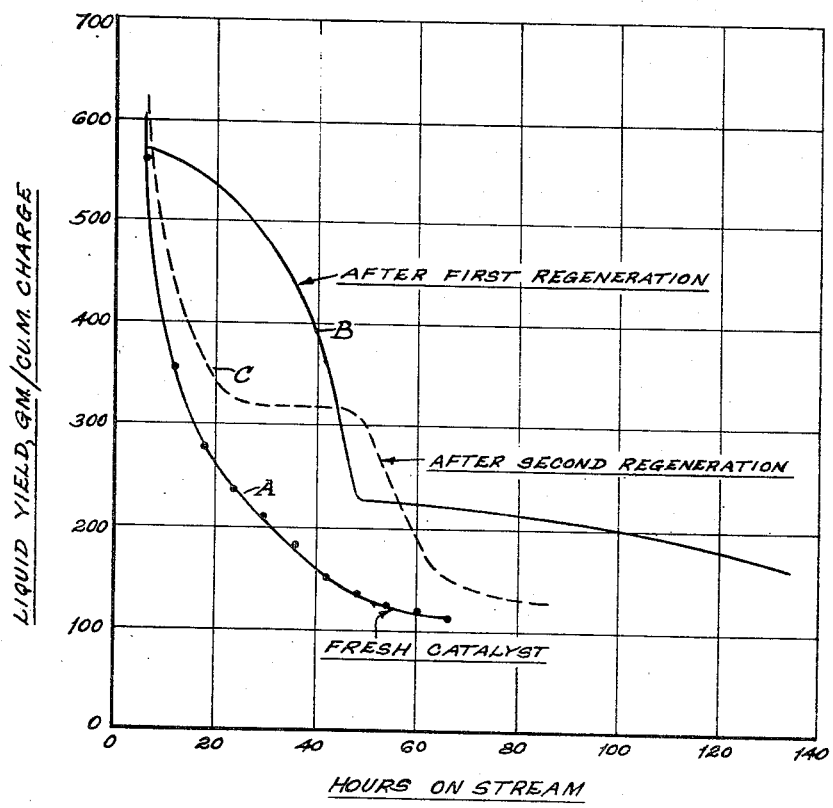

2,542,558

UNITED STATES PATENT OFFICE 2,542,558

REGENERATION OF A COBALT OXO SYNTHESIS CATALYST

Ernest A. Naragon, Glenham, and Alfred J. Millendorf and Joseph H. Vergilio, Beacon, N. Y., assignors to The Texas Company, New York, N. Y., a corporation of Delaware Application January 29, 1949, Serial No. 73,532

12 Claims. (Cl. 252—416)

This invention relates to a novel method for regenerating cobalt catalysts so as to restore them to a high level of activity for the catalytic conversion of carbon monoxide, hydrogen and olefins into carbonylic products.

In accordance with this invention, cobalt catalysts, which have been used in the catalytic conversion of carbon monoxide, hydrogen and olefins into carbonylic products and whose catalytic activity is at a low level, are regenerated to a high degree of catalytic activity by contact with steam at a temperature between 600 and 1000° F. for a period of at least 4 hours. Although steam treatment alone under the aforedescribed conditions restores spent cobalt catalysts to a high level of activity in the preparation of carbonylic products from olefins, carbon monoxide and hydrogen, it is advantageous to follow the steam treatment with a reduction treatment in order to obtain a higher degree of reactivation of the cobalt catalysts. The recommended reduction treatment comprises contacting the steam-treated cobalt catalysts with hydrogen at a temperature of approximately 450 to 750° F. for a period of at least 12 hours.

Cobalt catalysts have been found to be most effective for the conversion of olefins, carbon monoxide and hydrogen into carbonylic products. The production of carbonylic products from olefins, carbon monoxide and hydrogen is ordinarily effected at a temperature between 100 and 400° F. at a pressure of 200 to 5,000 pounds per square inch in the presence of a cobalt catalyst. Various techniques as exemplified by slurry type and fixed bed operations have been proposed and employed for the production of carbonylic products by the aforedescribed conversion. The relatively rapid deterioration of the catalytic activity of cobalt catalysts in this conversion combined with the fact that cobalt catalysts are expensive, has led to a search for a simple procedure for regenerating cobalt catalysts. Our discovery of a simple regenerating procedure for cobalt catalysts is a substantial factor in ensuring the commercial success of processes based on the olefin-CO—H₂ reaction.

The present invention provides a simple procedure for regenerating cobalt catalysts for reuse in the production of carbonylic products. The contacting of a spent cobalt catalyst with steam at a temperature between 600 and 1,000° F. for a period of at least 4 hours restores them to approximately their initial activity. Subjecting regenerated steam-treated catalysts to a reduction treatment for a period of at least 12 hours improves the catalytic activity of cobalt catalysts to such an extent that regenerated catalysts are superior to fresh cobalt catalysts both in initial activity and in catalyst life.

The steam treatment can readily be carried out in situ if production of carbonylic products is effected by contact of olefins, carbon monoxide and hydrogen with a fixed bed of cobalt catalysts. The recommended reduction treatment may also be effected in situ. If a slurry technique is employed to convert olefins, carbon monoxide and hydrogen into carbonylic products, spent catalyst is ordinarily filtered from the reaction slurry; the precipitate which is recovered on the filter apparatus can be contacted with steam and reduced in auxiliary equipment.

The steam treatment of spent cobalt catalysts is effected at a temperature between 600 and 1,000° F. and preferably at a temperature between 800 and 900° F. It has been found that the steam treatment proceeds smoothly at a temperature of approximately 800° F. and this temperature is employed in the regeneration of the catalysts whose activities are shown in the accompanying figure.

The recommended reduction treatment is effected at a temperature between 450 and 750° F. and preferably at a temperature between 600 and 700° F. A temperature of approximately 660° F. has been found to be particularly effective for contacting the steam-treated cobalt catalyst with hydrogen.

The regeneration treatment of the subject invention does not appear to have specific pressure limitations. Pressures between atmospheric and 1,500 pounds per square inch and up can be employed for both steam and hydrogen treatments. However, atmospheric pressure is preferred for both steam contacting and reduction.

It is necessary in order to effect a high degree of regeneration that the steam treatment be continued for at least 4 hours. For best results, the steam treatment is continued for a period of about 6 to 24 hours.

The recommended reduction treatment, comprising hydrogen treatment at a temperature between 450 and 750° F., is continued for a period of at least 12 hours with periods of 18 to 24 hours being preferred.

Steam is contacted with the spent cobalt catalyst at a space velocity between 50 and 500 wherein space velocity is defined as volumes of steam per volume of catalyst per hour. Space velocities of approximately 100 to 150 have been found to give excellent regeneration with a fixed bed of a supported standard cobalt catalyst whose composition will be described hereafter.

Space velocities between 50 and 500 are also prescribed for the recommended reduction treatment. In this instance, space velocity denotes volumes of hydrogen per volume of catalyst per hour.

The novel regeneration treatment of the subject invention is applicable to all cobalt catalysts that have been employed in the catalytic conversion of olefins, carbon monoxide and hydrogen into carbonylic products. Supported, unsupported, fused, precipitated, promoted and unpromoted cobalt catalysts are all regenerated by the process of this invention to a high level of activity in the production of carbonylic products. A preferred catalyst for the production of catalytic products is a precipitated cobalt catalyst in which catalytic cobalt is supported on an adsorptive material such as uncalcined diatomaceous earth, silica-stabilized alumina, etc., and which is promoted with minor quantities of oxides of materials such as magnesium, thorium, vanadium, manganese, calcium, etc. The efficacy of the regeneration procedures of the present invention will be demonstrated with a precipitated cobalt catalyst which has been designated a standard cobalt catalyst and which has a composition of approximately 64% uncalcined diatomaceous earth, 32% cobalt, 3% magnesia and 1% thoria.

In the accompanying figure there is shown graphically the results of the regenerative treatment of the subject invention. The preferred regenerative treatment, comprising steam treatment followed by reduction, was employed in the experiments shown in the accompanying figure. The reaction of ethylene, carbon monoxide and hydrogen to give a liquid product comprising mainly diethylketone is employed to demonstrate the effectiveness of the regenerative treatment of this invention in restoring cobalt catalysts to a high level of catalytic activity. In our copending application, Serial No. 773,938, filed September 13, 1947, there is disclosed a process for directing the reaction between ethylene and a mixture of carbon monoxide and hydrogen to form predominantly diethylketone. In brief, the conditions which must be observed in order to produce mainly diethylketone by the reaction of ethylene with carbon monoxide and hydrogen are summarized as follows: ethylene, carbon monoxide and hydrogen in a mol ratio of ethylene to carbon monoxide of at least 1.5 and a mol ratio of ethylene to hydrogen of at least 0.67 are contacted with a catalyst comprising a metal of the iron group, preferably cobalt; the temperature is maintained below 300° F. and preferably between 150 and 200° F., and the pressure is maintained above 100 pounds per square inch and preferably between 100 and 1,500 pounds per square inch. The liquid product obtained by the reaction of ethylene, carbon monoxide and hydrogen under the aforedescribed conditions comprises better than 60 weight per cent diethylketone.

The liquid yield in grams per cubic meter of charge is the best measure of catalytic activity and is employed in the accompanying graph as a measure thereof. In the accompanying figure, liquid yield in grams per cubic meter of charge is plotted on the ordinate axis against on-stream time in hours on the abscissa axis.

The activity of a fresh standard cobalt catalyst is represented by curve A. Ethylene, carbon monoxide and hydrogen at a mol ratio of 2:1:1 were passed at a space velocity of 100 into contact with a fixed bed of standard cobalt catalyst comprising 64% uncalcined diatomaceous earth, 32% cobalt, 3% magnesia and 1% thoria, at a pressure of 300 pounds per square inch and at a temperature of 150° F. The liquid yield in grams per cubic meter of charge mixture at various periods of on-stream time is represented by curve A. It will be noticed that the catalytic activity of the fresh cobalt catalyst falls off fairly rapidly. After 6 hours of operation a liquid yield of approximately 560 grams per cubic meter is obtained, whereas after 66 hours the yield has fallen to approximately 115 grams per cubic meter of charge.

Curves B and C illustrate the effect achieved by contacting a spent cobalt catalyst with steam and then with hydrogen in accordance with the method of this invention. The regenerative treatment comprised contacting the spent cobalt catalyst with steam for 6 hours at an atmospheric pressure of 800° F. and at a space velocity of 160 and thereafter contacting the steam-treated catalyst with hydrogen for a period of 18 hours at 660° F. and atmospheric pressure at a space velocity of 100.

After the spent cobalt catalyst was regenerated in accordance with the aforedescribed treatment, it was reused in the catalytic conversion of ethylene, carbon monoxide and hydrogen into diethylketone. The results obtained after one regeneration treatment are graphically represented by curve B. The conditions employed for the conversion with the once-regenerated catalyst are as follows: ethylene, carbon monoxide and hydrogen in a mol ratio of 2:1:1 were introduced at a space velocity of 100 into a reaction zone containing a fixed bed of once-regenerated cobalt catalyst; the reaction zone was maintained at a temperature of 200° F. and 1,100 pounds per square inch. It can readily be seen that the regenerative treatment of the subject invention substantially enhances the activity of the catalyst. The catalyst is restored to an initial activity approximating that of the fresh catalyst and has an improved catalyst life since it maintains a higher degree of conversion for a longer period of time. It is true that the regenerated catalyst is evaluated at 1,100 pounds per square inch rather than at 300 pounds per square inch employed for the evaluation of the fresh catalyst. The higher pressure slightly enhances the catalyst conversion but not to the extent of the improvement realized by the preferred regenerative treatment of this invention.

The once-regenerated catalyst after 140 hours on stream was then subjected to a similar regenerative procedure and restored the catalyst to a level of activity illustrated by curve C. The conditions employed in the evaluation of the twice-regenerated catalyst were the same as those used for the evaluation of the once-regenerated catalyst. Curve C proves that a catalyst, after being twice subjected to the preferred regenerative treatment of this invention, is superior to a fresh catalyst; the preferred regenerative treatment restores the spent catalyst to initial activity approximately equivalent to that of a fresh catalyst and also bestows on it a catalyst life superior to that of a fresh catalyst.

The experiments graphically shown in the accompanying figure conclusively establish the efficiency of this invention for regenerating cobalt catalysts which have become spent in the conversion of olefins, carbon monoxide and hydrogen into carbonylic products.

It must also be borne in mind that a regenerative treatment comprising merely contacting spent catalyst with steam at a temperature of between 600 and 1,000° F. also restores catalysts to a high level of activity. The regenerative treatment consisting only of steam contacting at a temperature of 600 to 1,000° F. produces a catalyst whose activity is approximately that of a fresh catalyst. Spent catalyst is restored by steam treatment alone to an activity curve approximately that shown by fresh cobalt catalysts.

Obviously, many modifications and variations of the invention, as hereinbefore set forth, may be made without departing from the spirit and scope thereof, and therefore only such limitations should be imposed as are indicated in the appended claims.

We claim:

1. A process for regenerating cobalt catalysts which have become spent in the catalytic conversion of olefins, carbon monoxide and hydrogen into carbonylic products, which comprises contacting a spent cobalt catalyst with steam at a temperature between 600 and 1,000° F. for a period of at least 4 hours.

2. A process according to claim 1 in which steam is contacted with spent cobalt catalyst at a temperature between 800 and 900° F.

3. A process according to claim 1 in which a spent catalyst is contacted with steam for a period between 6 and 24 hours.

4. A process according to claim 1 in which steam is contacted with spent catalyst at a space velocity between 50 and 500.

5. A process according to claim 1 in which the cobalt catalyst comprises about 64% uncalcined diatomaceous earth, 32% cobalt, 3% magnesia and 1% thoria.

6. A process according to claim 1 in which steam is contacted with spent catalyst at atmospheric pressure.

7. A process for regenerating cobalt catalysts which have become spent in the catalytic conversion of olefins, carbon monoxide and hydrogen into carbonylic products, which comprises contacting a spent cobalt catalyst with steam at a temperature between 600 and 1,000° F. for a period of at least 4 hours, and thereafter contacting said steam-treated catalyst with hydrogen for a period of at least 12 hours at a temperature of between 450 to 750° F.

8. A process according to claim 7 in which spent cobalt catalyst is contacted with steam at a temperature of 800 to 900° F. and with hydrogen at a temperature between 600 and 700° F.

9. A process according to claim 7 in which spent cobalt catalyst is contacted with steam at a space velocity between 50 and 500 and with hydrogen at a space velocity between 50 and 500.

10. A process according to claim 7 in which spent cobalt catalyst is contacted with steam for a period between 6 and 24 hours and with hydrogen for a period between 18 and 24 hours.

11. A process according to claim 7 in which the cobalt catalyst comprises about 64% uncalcined diatomaceous earth, 32% cobalt, 3% magnesia and 1% thoria.

12. A process according to claim 7 in which steam and hydrogen are contacted with spent catalyst at atmospheric pressure.

ERNEST A. NARAGON.
ALFRED J. MILLENDORF.
JOSEPH H. VERGILIO.

REFERENCES CITED

The following references are of record in the file of this patent:

UNITED STATES PATENTS

| Number | Name | Date |
|---|---|---|
| 1,904,440 | Freyermuth et al. | Apr. 18, 1933 |
| 1,915,362 | Hanks et al. | June 27, 1933 |
| 2,244,196 | Herbert | June 3, 1941 |
| 2,433,072 | Stewart et al. | Dec. 23, 1947 |